(12) United States Patent
Dhar et al.

(10) Patent No.: US 7,042,881 B1
(45) Date of Patent: May 9, 2006

(54) ASYNCHRONOUS TRANSFER MODE SYSTEM AND METHOD TO VERIFY A CONNECTION

(75) Inventors: Sandeep Dhar, Sunnyvale, CA (US); Dean Cheng, Fremont, CA (US); ShuHung Alexander Mak, Fremont, CA (US)

(73) Assignee: Cisco Technology, Inc., San Jose, CA (US)

( * ) Notice: Subject to any disclaimer, the term of this patent is extended or adjusted under 35 U.S.C. 154(b) by 814 days.

(21) Appl. No.: 09/895,656

(22) Filed: Jun. 29, 2001

(51) Int. Cl.
*H04L 12/56* (2006.01)

(52) U.S. Cl. .................................. 370/395.2
(58) Field of Classification Search .......... 370/395.2, 370/395.21
See application file for complete search history.

(56) References Cited

U.S. PATENT DOCUMENTS

| | | | |
|---|---|---|---|
| 6,298,043 B1 * | 10/2001 | Mauger et al. | 370/248 |
| 6,477,566 B1 * | 11/2002 | Davis et al. | 709/223 |
| 6,483,836 B1 * | 11/2002 | Gazier et al. | 370/395.21 |
| 6,515,967 B1 | 2/2003 | Wei et al. | |
| 6,636,484 B1 | 10/2003 | Agrawal et al. | |
| 6,643,267 B1 | 11/2003 | Karia et al. | |
| 6,741,597 B1 * | 5/2004 | Jeong | 370/395.21 |
| 6,765,877 B1 | 7/2004 | Foschiano et al. | |
| 6,781,952 B1 * | 8/2004 | Shirakawa | 370/217 |
| 2003/0179701 A1 | 9/2003 | Saleh et al. | |

\* cited by examiner

*Primary Examiner*—Min Jung
(74) *Attorney, Agent, or Firm*—Blakely, Sokoloff, Taylor & Zafman LLP (57) ABSTRACT

A method, and apparatus to transmit an ATM data message from a source node to a destination node, and reflect at least a portion of the data back t where it is compared to the transmitted data. The destination node includes a reflection circuit service located at a specific selector code address, and the destination node listens for a transmission to the specific selector code for reflecting the portion of received data in a subsequent data message for the connection. The source node addresses a setup message to the destination node containing the specific selector code, and compares the transmitted message with the received message. The source node also includes a method and apparatus to send alternatively trace and path trace information as an attachment to a transmitted message, receive the reflected information element, and pass hop data contained within the information element to a user interface for presentation to a user.

26 Claims, 7 Drawing Sheets

ASYNCHRONOUS TRANSFER MODE SYSTEM AND METHOD TO VERIFY A CONNECTION

TECHNICAL FIELD OF THE INVENTION

This disclosure relates generally to Asynchronous Transfer Mode data networks, and particularly but not exclusively relates to a signal reflection and trace function on an Asynchronous Transfer Mode transmission device.

BACKGROUND

Asynchronous Transfer Mode (ATM) is a dedicated-connection, cell switching, data network protocol and technology. ATM organizes digital data into constant length cells, and switches these cells between transmission devices according to specified protocol. In ATM, connection data is switched between a source transmission device and a destination transmission device across a data path (or circuit or data pipe). In ATM, connection control signals are switched between the source transmission device and the destination transmission device across a signaling path (or signaling circuit or signaling pipe) that is separate from the data path.

In ATM, because the data and the control signals are each transmitted across the separate pipes, verifying a signaling connection is not the same as verifying that a data communication can or has been made. And in ATM, if a connection has been set up meaning that the signalling path has been established, the data path may not be established; or if the data path has been established, the data path may not transmit data properly, and thus data transmissions may be flawed. What is needed is an apparatus and a method to verify that a data path has been established. Current systems and methods do not verify that the data path transmits data from a source transmission device to a destination transmission device, and from the source transmission device to the destination transmission device without error.

In ATM, a data pipe is generally formed by a connection from a source transmission device through a sequence of a plural number of intermediate transmission devices to the destination transmission device. Each time a packet is forwarded through an intermediate transmission device, a "hop" occurs. Any data path can take a plural number of routings from the source transmission device to the destination transmission device. The more hops, the longer it takes for data to go from source to destination. Current systems do not tell users how many hops there are along the data path from the destination transmission device to the source transmission device, the identity of each intermediate transmission device, and how long each intermediate transmission device takes to process a hop.

SUMMARY OF THE INVENTION

A system to transmit an ATM data message on an ATM network from a source transmission device to a destination device, and reflect at least a portion of the data received by the destination transmission device back to the source transmission device where it is compared to the data that was transmitted from the source transmission device is described. One embodiment of the invention includes an ATM transmission device having a destination hold circuit to hold a determined selector identification; a first destination receive circuit to receive a setup message having a first selector content and establish a connection; a second destination receive circuit to receive on the connection a first ATM data message having a first data from an ATM source transmission device; a destination read circuit to read the first selector content and compare the first selector content to the selector identification; and a destination compose circuit to compose a second data message having a transmitted second data based on the received first data and an address of the source transmission device and send the second data message if the first selector content corresponds to the determined selector identification.

Other features and advantages of the present invention will be apparent from the accompanying drawings and from the detailed description that follows below.

BRIEF DESCRIPTION OF THE DRAWINGS

The present invention is illustrated by way of example and not limitation in the figures of the accompanying drawings in which like references indicate similar elements and in which.

DETAILED DESCRIPTION OF THE ILLUSTRATED EMBODIMENTS

Figure 1A:
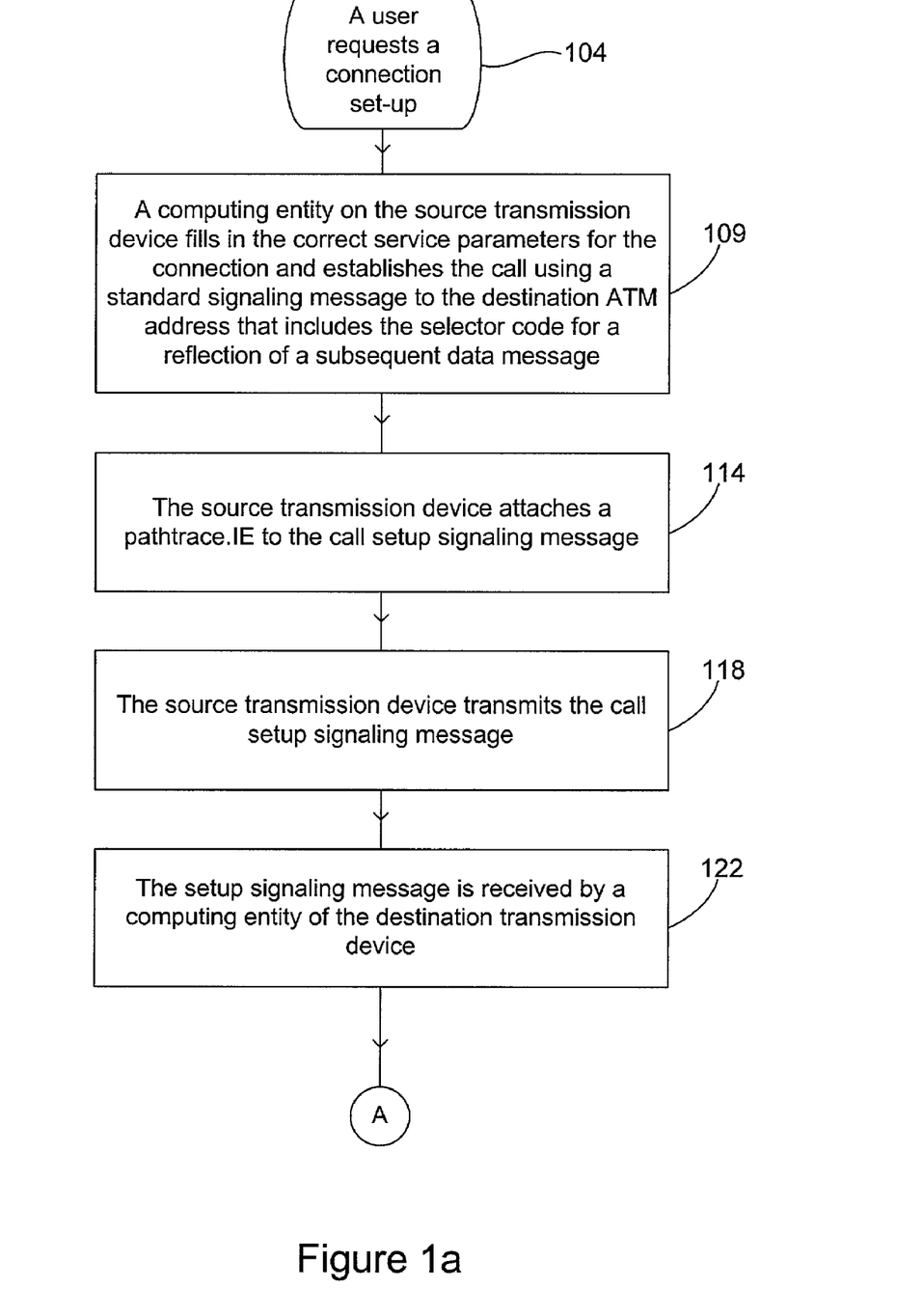
FIGS. 1a–1d is a flowchart illustrating the operation of an ATM source transmission device in transmitting a message to-be reflected from the ATM destination transmission device and in transmitting received trace data to a user interface, and the destination device in reflecting the received message.
Figure 1B:
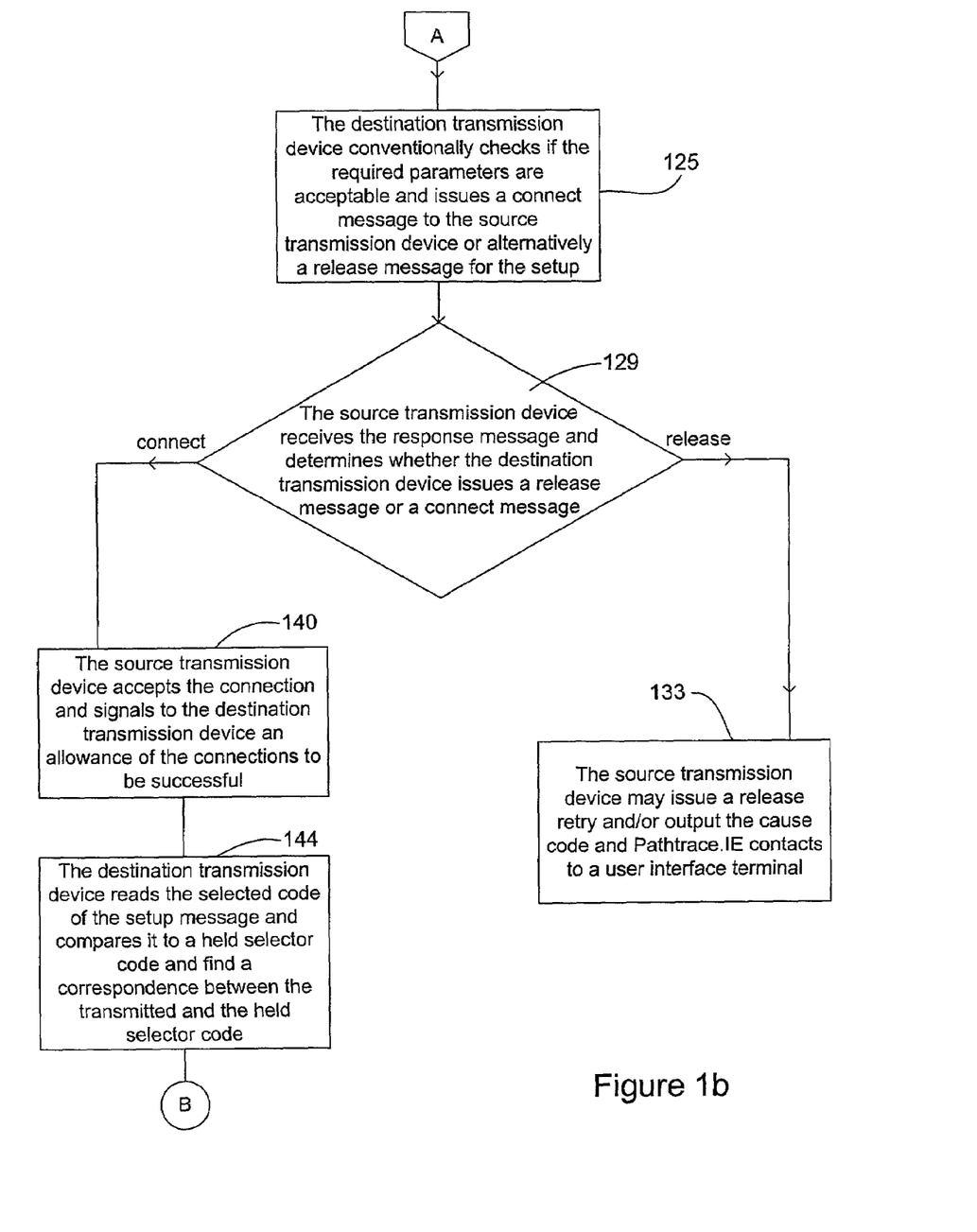
Figure 1C:
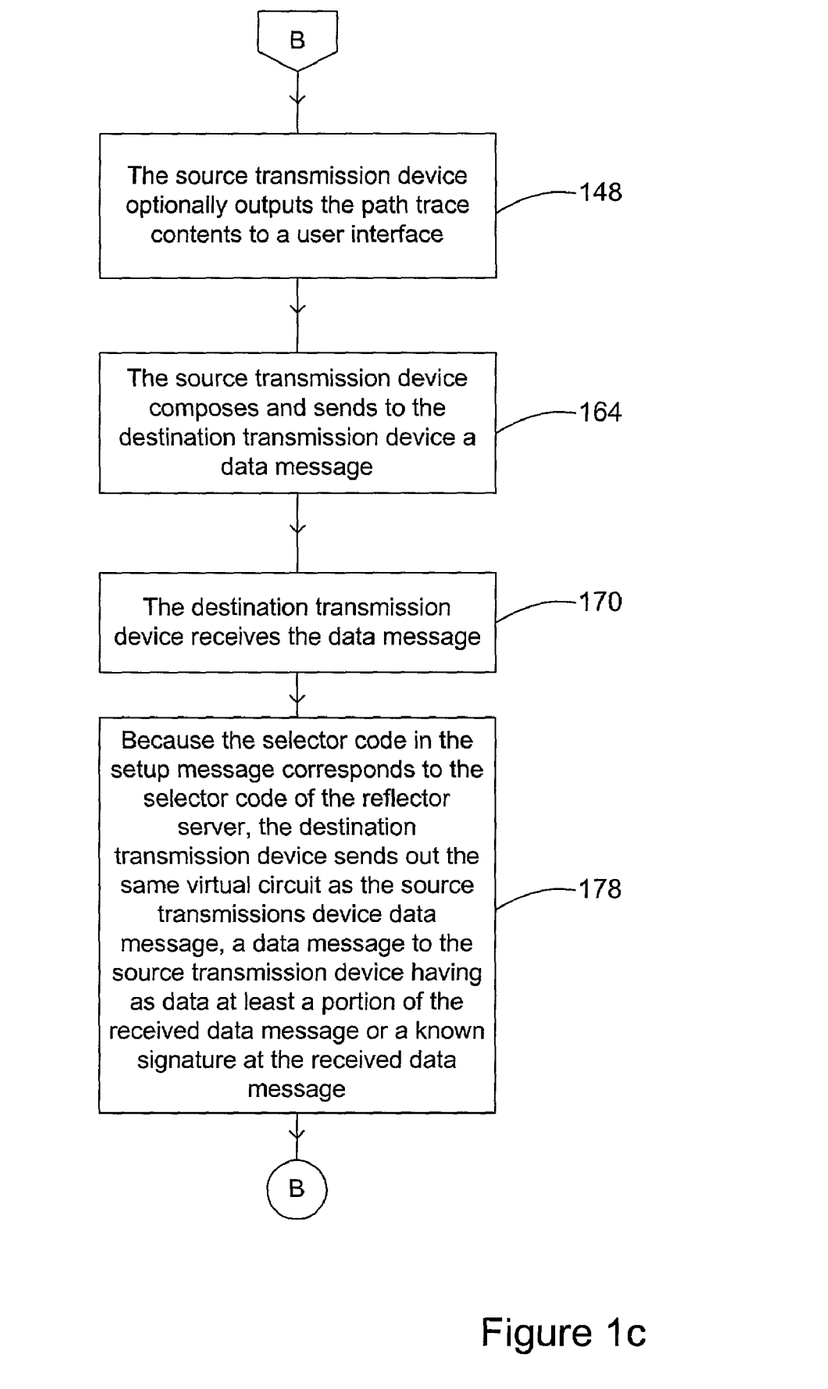
Figure 1D:
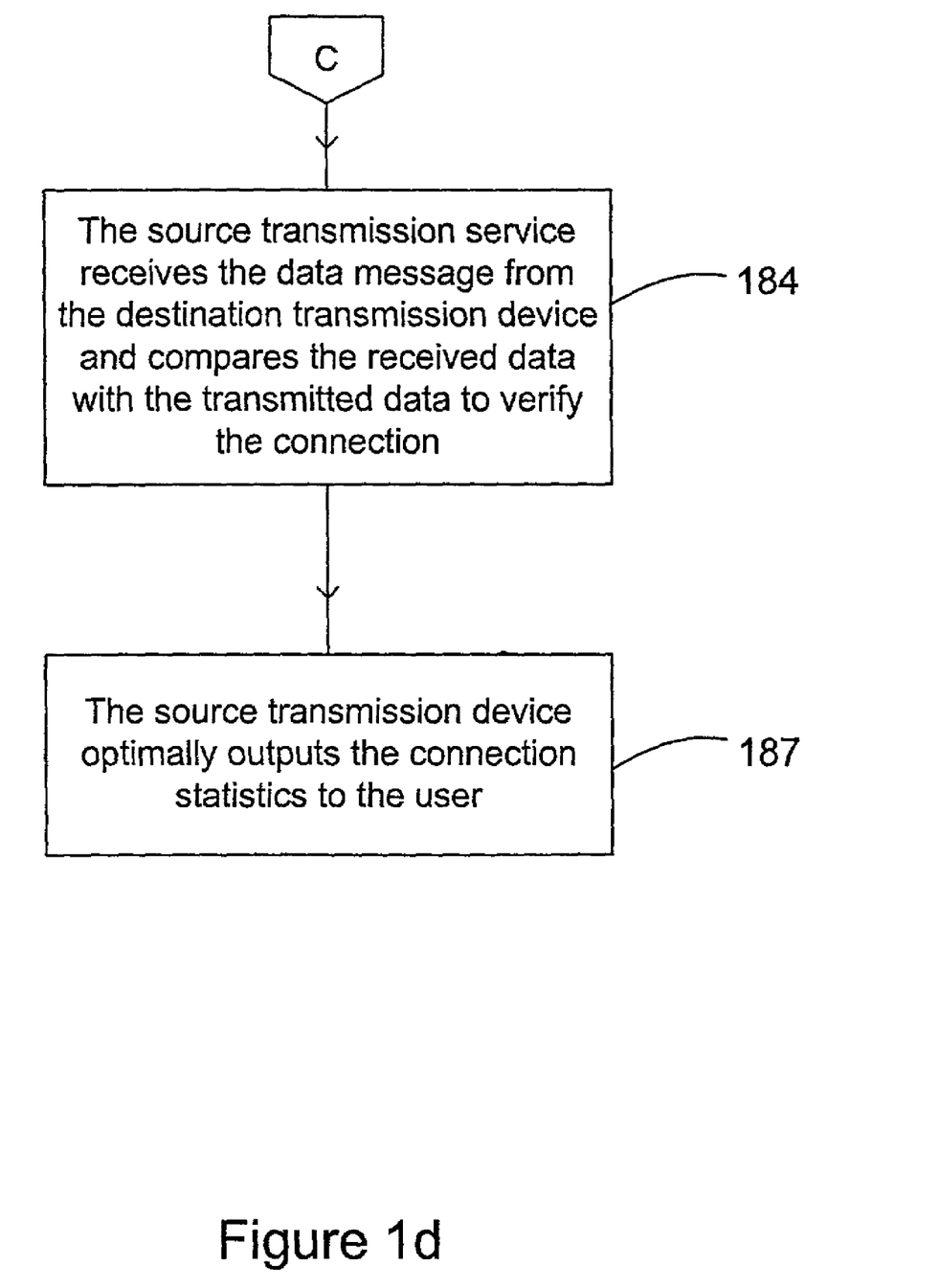
Figure 2:
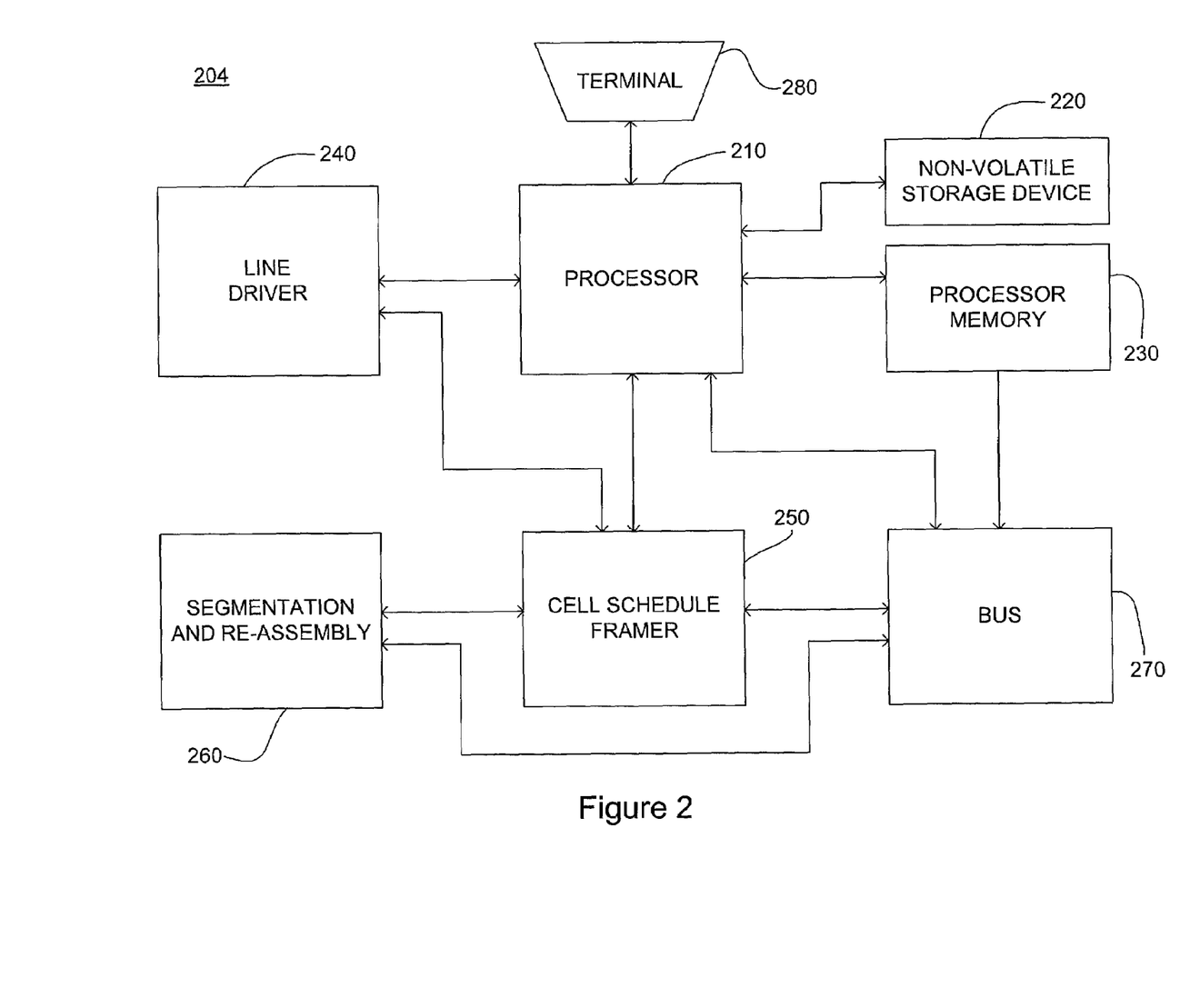
FIG. 2 is a block diagram of an ATM transmission device.

FIG. 2 is a block diagram of an ATM transmission device that embodies the invention. The ATM transmission device may operate as an ATM source transmission device or as an ATM destination transmission device for the purposes of the present invention. The block diagram is described further below.

FIGS. 1a–1d, is a flowchart describing the operation and circuit characteristics of an ATM source transmission device in transmitting a message to be reflected from the ATM destination transmission device and in transmitting received trace data to a user interface, and of the destination device in reflecting the received message. As portrayed below, the destination transmission has circuitry to listen for a determined address selector code, and the source transmission device has circuitry to encode an address selector code conforming to the destination address selector code. The destination transmission device upon reading the selector byte, reflects at least a portion of the data back to the source transmission device, that compares the sent data and the received data to evaluate whether the data connection has corrupted the transmission.

An embodiment includes in block 104 a user requesting a connection setup on an ATM network, and a verification of the data connection.

In block 109, the ATM network source transmission device, and preferably a computing entity on the ATM network source transmission device responding to a stored computer program, conventionally establishes up a call connection with a specified ATM network destination transmission device. In order to establish the connection, the source transmission device fills in the information elements (or service parameter data) for the connection. This service parameter data includes a traffic descriptor, QOS parameter, and other data well known to those skilled in the pertinent art, that are individually user specified or filled in from default values. The destination transmission device address is conventionally obtained and is alternatively a name or an address. The ATM network destination transmission device has preferably registered its network address and with the network name server and is ready to receive signaling messages on this address, i.e. ready to listen on this address.

The address includes the reflection service selector code byte for the reflection service in the destination transmission device. An ATM network does not route on the selector byte field of an address, but the addressed node distinguishes the selector byte for routing within the node to different services, functions, or entities, within the node. In the present invention, a determined selector byte code is reserved for a routing to the message reflection service of the present invention, wherein a destination transmission device listens for the reflection service selector code byte, and if an incoming message indicates that byte, the incoming data message is reflected back to the source transmission node (or device) as will be presently disclosed.

The source transmission device acquires the reflection selector code of the destination transmission device. In a preferred embodiment, all transmission devices in an ATM network provide a signal reflection service (or server) trigger on the same selection code. In another embodiment, the selection codes in at least two transmission devices are different selection codes, and a source transmission device will have the selection code for the connection destination transmission device, whether by storing it as a predetermined value, receiving it, or deriving it according to an algorithm.

In block 114, the source transmission device attaches a pathtrace information element to the call setup signaling message built in block 109. In other embodiments of the present invention, the source transmission device instead attaches a trace information element to a message where in current ATM protocol, a trace information element is for an already existing connection, and not a pathtrace which is for a new connection. In block 118, the source transmission device transmits the call setup signaling message to the destination transmission device address (or name).

In block 122 the setup signaling message composed and transmitted by the destination transmission device in blocks 109–118 above is received by the source transmission device, preferably a computing entity of the source transmission device responding to a stored program on the source transmission device.

In block 125, the destination transmission device determines in response to the received setup signaling message, whether the required parameters are acceptable and composes and transmits to the source transmission device a response message that is alternatively a connect message for allowing the call to go through, or a release message for releasing the connection. The destination transmission device of the present invention includes a message reflection service of the present invention on a determined selector byte. A destination transmission device listens for the reflection service selector code byte, and if an incoming message indicates that byte, the incoming data message is reflected back to the source transmission node (or device).

In block 129, the source transmission device receives the response message from the destination transmission device and determines whether it is a connect message or a release message.

If the response message in block 129 is a release message, control passes to block 133. In block 133 the source transmission device reads the cause code of the release message and depending upon the cause code and user direction, alternatively does or does not issue a release retry to the destination transmission device and outputs the cause code to the user via a user interface on a circuit path such as a User Network Interface (UNI). The source transmission device optionally sends the received pathtrace hop data from the destination transmission device and the intermediate transmission devices to the user via a user interface on a circuit path, in an optionally reformatted presentation.

If the response message in block 129 is a connect message, control passes to block 140. In block 140, the source transmission device accepts the connection and signals to the destination transmission device an allowance of the connection to be successful.

In block 144, the destination transmission device has read the selector code byte of the transmitted setup message, compared it to a held selector code, and found a correspondence between the held selector code and the selector code sent in the setup message, where correspondence may mean an identity, an identity of at least one byte, or an identity of an algorithmically modified selector code. The destination transmission device is set to reflect back an at least one subsequent data message from the source transmission device for the current connection.

In block 148 the source transmission device optionally stores and/or sends the received pathtrace hop data from the destination transmission device and the intermediate transmission devices to the user via a user interface on a circuit path, in an optionally reformatted presentation, and optionally sends to the user an indication of a successfully established signaling path.

In block 164, the source transmission device composes and sends to the destination transmission device a data message. The data message is according to the option parameters specified in block 109, and data message parameters such as packet mode, streaming mode timestamp, and checksum, either as specified or as default values, well known to those skilled in the pertinent art.

In block 170, the destination transmission device receives the data message transmitted by the source transmission device in block 164. In block 178, the destination transmission device prepares and transmits a reflection of the received data message to the source transmission device. The reflection includes a reflection of all the input data, a reflection (or identity of at least a portion of the data), or an algorithmically altered selection of a least a portion of the input data, wherein it is preferred that all data be reflected back without any alteration.

In block 184, the source transmission device receives the data message from the destination transmission device and compares the received data with the transmitted data, according to whether the reflected received data is all the transmitted data, a portion of the transmitted data, or an algorithmically altered at least a portion of the transmitted data, as specified in block 178. In block 187, the source transmission device optionally outputs the connection statistics to the user.

Referring now to FIG. 2, an ATM transmission device circuit 204 includes an embedded processor 210 programmed to execute the operations of the signal reflection server and pathtrace/.trace display server of the present invention. The processor 210 is coupled to a RAM/ROM 230 that stores the coded instructions for the processor 210 to execute, and furnishes the dynamic storage memory utilized by the processor 210 in running the coded instructions. The RAM/ROM 230 is an embodiment of a machine readable medium which when executed by at least one processor 210, causes the processor 210 to perform the operations comprising the ATM transmission device circuit 204 that include transmitting a data message having data to a destination ATM transmission device, and having a message address selector code to cause the destination transmission device to reflect at least a portion of the received data to the ATM transmission device circuit 204, and causing the ATM transmission device circuit 204 to reflect at least a portion of a received data to a source ATM transmission device if the selector byte of the address corresponds to a stored selector code. The ATM transmission device circuit 204 includes a disk or other large capacity and non-volatile storage device 220, to permanently store data.

With particularity, the processor 210 and system memory 220 and 230 together constitute at least in part a destination hold circuit to hold a determined selector identification; a first destination receive circuit to receive a setup message having a first selector content and establish a connection; a second destination receive circuit to receive an ATM data message having a data; a destination read circuit to read the selector content and compare the selector content to the reflection server selector identification; a destination compose circuit to compose a data message having data based on an input data; a compose circuit to compose a setup message having a selector content indicating a reflector server function; and a compare circuit to compare a transmitted first data to a received second data if the source transmission device receives a data message.

Figure 4:
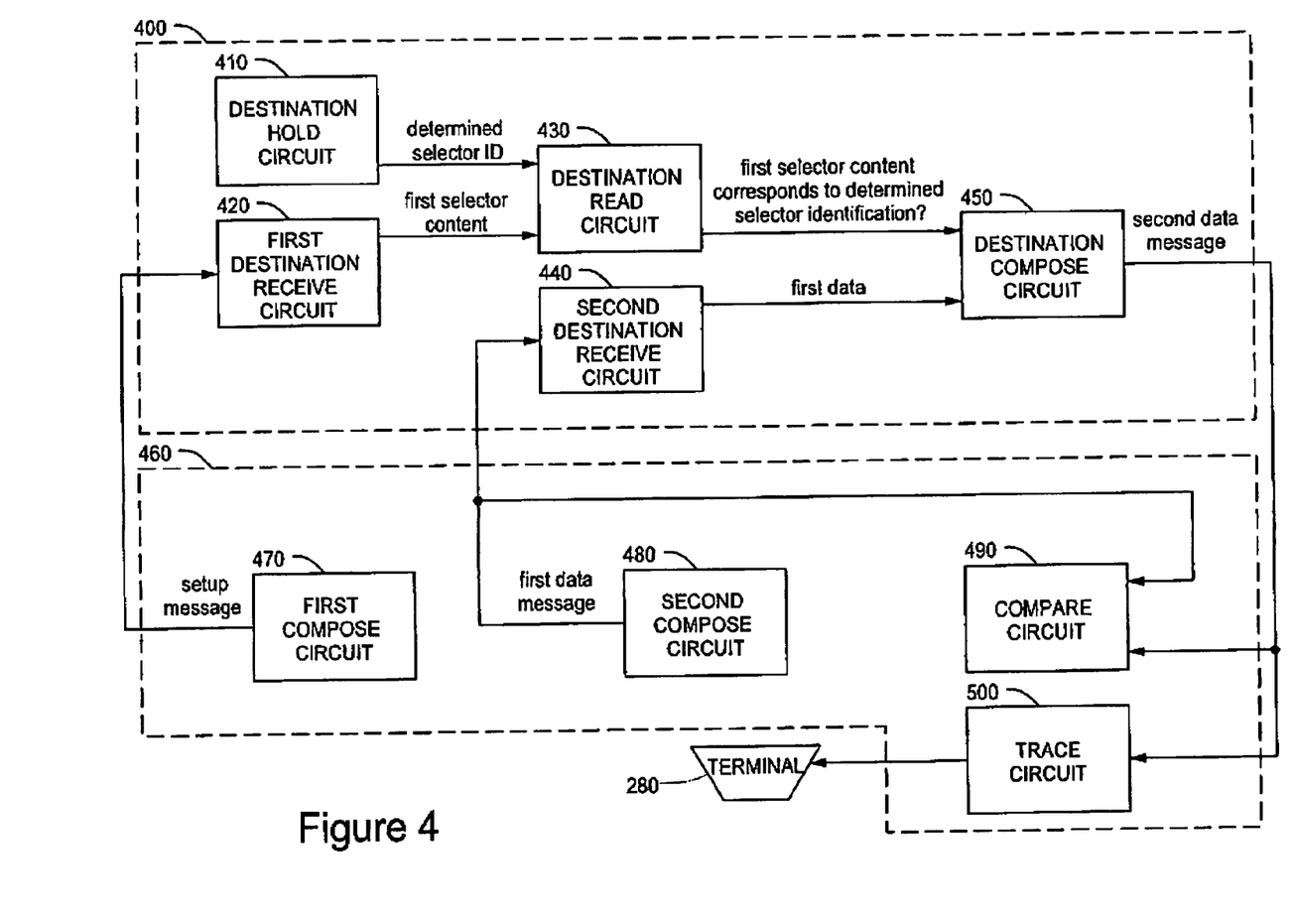
FIG. 4 shows a block diagram of circuits within an ATM destination transmission device and an ATM source transmission device.

FIG. 4 shows a block diagram of circuits within an ATM destination transmission device 400 and an ATM source transmission device 460. The ATM destination transmission device 400 may include a destination hold circuit 410, a first destination receive circuit 420, a second destination receive circuit 440, a destination read circuit 430, and a destination compose circuit 450. The destination hold circuit 410 holds determined selector identification. The first destination receive circuit 420 receives a setup message having a first selector content and establish a connection. The second destination receive circuit 440 receives on the connection a first data message having a first data from the ATM source transmission device 460. The destination read circuit 430 is coupled to the first destination receive circuit 420 and to the destination hold circuit 410 to read the first selector content and compare the first selector content to the selector identification. The destination compose circuit 450 is coupled to the second destination receive circuit 440 and to the destination read circuit 430 to compose a second data message having a to-be transmitted second data based on the received first data and an address of the source transmission device and to send the second data message if the first selector content corresponds to the determined selector identification.

The ATM source transmission device 460 may include a first compose circuit 470, a second compose circuit 480, a compare circuit 490, and a trace circuit 500. The first compose circuit 470 is coupled to the first destination receive circuit 420. The first compose circuit 470 composes the setup message having the first selector content that may be received by the first destination receive circuit 420 or the ATM destination transmission device 400. The second compose circuit 480 is coupled to the second destination receive circuit 440. The second compose circuit 480 composes the first data message that may be received by the second destination receive circuit 440 of the ATM destination transmission device 400. The compare circuit 490 is coupled to second compose circuit 480 and to the destination compose circuit 450. The compare circuit 490 compares the transmitted first data to the received second data if the ATM source transmission device 460 receives the second data message. The trace circuit 500 is coupled to the destination compose circuit 450. The trace circuit 500 receives an information element which may be a trace information element containing hop information or a path trace information element containing pathtrace information. The trace circuit 500 transmits at least a portion of the information element to a user interface such as a display terminal 280 or a printing device. The trace circuit 500 may format at least a portion of the information element for such display or printing.

The ATM transmission device circuit 204 additionally includes a line driver 240 to provide an interface to the physical line or trunk which can be a large variety of embodiments including SONET/T1/E1/T3/E3. The line driver 240 converts an on line information whose embodiment may include electrical impulses or laser wavelengths into a bit stream. The ATM transmission device circuit 204 includes an ATM Cell Scheduler/Framer 250 to serve as layer 1 of the ATM protocol stack, to convert the bit stream provided by the Line Driver 240 to ATM cells. The ATM transmission device circuit 204 includes a Segmentation and Re-assembly (SAR) circuit 260 to convert the ATM cell stream into the ATM Adaptation Layer (AAL) datagram frames to the user, and to segment the packets given by the user (which may be in the form of Internet protocol datagrams or packets having no guaranteed sequential delivery) into ATM cells to be sent on the ATM network. The ATM transmission device circuit 204 includes a high speed bus 270 to transfer data within the circuit 204. The ATM transmission device circuit 204 in an embodiment also includes a terminal 280 that may be in the form of a display, printer, keyboard and other devices to receive information from the processing unit 210 and to input information to the processing unit 210, and is the interface through which a user or an operator runs the various commands (e.g. the reflection/trace/pathtrace function of the present invention, and in an embodiment receives the trace/pathtrace data portrayed with reference to FIG. 3). The terminal 280 in an embodiment is coupled to the ATM transmission device circuit 204 through a User Network Interface (UNI) (not shown).

Figure 3:
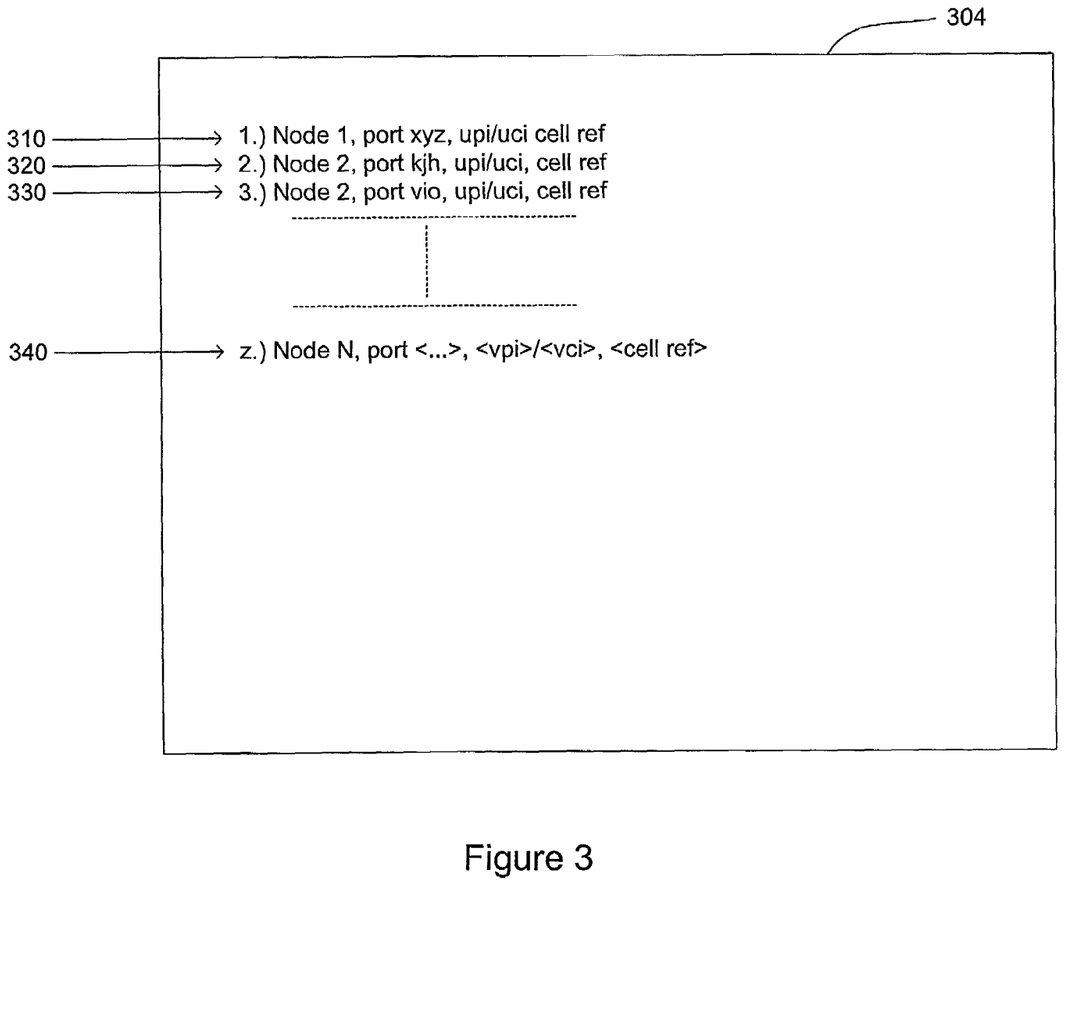
FIG. 3 is a user display of received trace data transmitted from an ATM source transmission device to the user display.

Referring now to FIG. 3, a transmission device of the present invention receives trace and pathtrace lists added to a data message and a setup message respectively that includes the hop data from each of the intermediate transmission devices that are in the data path from the destination transmission device to the source transmission device. The source transmission device parses the hop data, then formats a portion of the data for transmission to a user terminal such as a display or a printer. The information output to a user is formatted according to node #, port identification, (virtual path identifier/virtual connection identifier (vpi/vci), callref. For a successful connection, each hop should be portrayed, and for a failed connection, each node till the connection failed with the cause value. A display 304 has a first line 310 for a node 1, a second line 414 for a node 2 with a port "xyz", a third line 320 for a node 2 with a port "uio", and other lines 330 for other nodes, and a last line 340 for a node N, port "< . . . >", wherein for each of the nodes, the vpi/vci and callref fields are left illustratively as "vpi/vci" and "callref" respectively.

Embodiments of this invention include program operations stored on a machine readable medium. A machine readable storage medium includes any mechanism that provides (i.e. stores and/or transmits) information in a form readable by a machine (e.g. a computer). For example, a machine readable medium includes read only memory (ROM), random access memory (RAM), magnetic disk storage media, optical storage media, flash memory devices, electrical, optical, acoustical or other from of propagated signals (e.g. carrier waves, infrared signals, digital signals, etc.) etc.

In the foregoing specification, the invention has been described with reference to specific exemplary embodiments thereof. It will, however be evident that various modifications and changes may be made thereto without departing from the broader spirit and scope of the invention as set forth in the appended claims. The specification and drawings are, accordingly, to be regarded in an illustrative rather than a restrictive sense.

What is claimed is:

1. A system comprising an ATM destination transmission device, the ATM destination transmission device having:
   a destination hold circuit to hold determined selector identification;
   a first destination receive circuit to receive a setup message having first selector content and establish a connection on an ATM network;
   a second destination receive circuit to receive on the connection a first data message having a first data from an ATM source transmission device;
   a destination read circuit coupled to the first destination receive circuit and the destination hold circuit, the destination read circuit to read the first selector content and compare the first selector content to the selector identification; and
   a destination compose circuit coupled to the second destination receive circuit and the destination read circuit, the destination compose circuit to compose a second data message having a second data based on the first data and an address of the ATM source transmission device and to send the second data message if the first selector content corresponds to the determined selector identification.

2. The system defined in claim 1 wherein at least a portion of the second data is the first data.

3. The system defined in claim 1 wherein the second data is the first data.

4. The system defined in claim 1 wherein the ATM destination transmission device includes a processor to respond to a coupled stored program, and the processor responding to the stored program includes at least one of the first destination receive circuit, the second destination receive circuit, the destination read circuit, and the destination compose circuit.

5. The system defined in claim 1 further including an ATM source transmission device, the ATM source transmission device having:
   a first compose circuit coupled to the first destination receive circuit, the first compose circuit to compose the setup message having the first selector content;
   a second compose circuit coupled to the second destination receive circuit, the second compose circuit to compose the first data message and to transmit the first data message to the second compose circuit; and
   a compare circuit coupled to the second compose circuit and to the destination compose circuit, the compare circuit to compare the first data to the second data if the ATM source transmission device receives the second data message.

6. The system defined in claim 5 wherein the ATM source transmission device includes a processor to respond to a coupled stored program, and the processor responding to the stored program includes at least one of the fist compose circuit, the second compose circuit, the transmit circuit, and the compare circuit.

7. The system defined in claim 5 wherein the ATM source transmission device includes a trace circuit coupled to the destination compose circuit, the trace circuit to receive an information element characterized by one of a trace information element containing hop information and a pathtrace information element containing pathtrace information, and to transmit at least a portion of the information element to a user interface.

8. The system defined in claim 5 wherein the ATM source transmission device includes a trace circuit coupled to the destination compose circuit, the trace circuit to receive an information element characterized by one of a trace information element containing hop information and a pathtrace information element containing pathtrace information, and to format at least a portion of the information element for at least one of displaying the portion of information on a display terminal and printing the portion of information on a printing device.

9. The system defined in claim 5 wherein the ATM destination transmission device includes a circuit to receive one of a trace information element containing hop information and a pathtrace information element containing pathtrace information, and a circuit to transmit at least a portion of the hop information to a user interface.

10. A method comprising:
    a ATM source transmission device sending a setup message having an address selector set to a determined value to cause a ATM destination transmission device to send a first confirming data message in response to receiving the first data message to establish an ATM connection between the ATM source transmission device and the ATM destination transmission device, and to reflect a subsequent data message on the connection;
    the ATM source transmission device establishing a connection between the ATM source transmission device and the ATM destination transmission device in response to the ATM destination transmission device receiving the setup message; and
    the ATM source transmission device sending a first data message to the ATM destination transmission device after the ATM source transmission device establishes the connection, the first data message having a first data.

11. The method defined in claim 10
    wherein the ATM source transmission device sending the setup message includes the ATM source transmission device attaching a trace information element to the setup message;
    the establishing a connection includes the ATM source transmission device receiving a received trace response; and
    the ATM source transmission device sending at least a portion of the received trace response to a user interface.

12. The method defined in claim 10 further including
    the ATM destination device receiving the setup message;
    the ATM destination device reading the address selector;

the ATM destination transmission device receiving the first data message;

if the address selector byte corresponds to the determined value, the ATM destination transmission device sending a second data message to the ATM source transmission device having a second data that includes at least a portion of the first data.

13. The method defined in claim 12 further including the ATM source transmission device receiving the second data message; and
the ATM source transmission device comparing the first data to the second data.

14. A method comprising:
an ATM destination transmission device receiving a setup message having a first address selector from an ATM source transmission device;
establishing a connection between the ATM destination transmission device and the ATM source transmission device;
the ATM destination transmission device receiving a first data message having a first data on the connection;
the ATM destination transmission device comparing the first address selector to a determined address selector of the ATM destination transmission device and if the first address selector corresponds to the determined address selector, the ATM destination transmission device composing and sending a second data message to the ATM source transmission device having at least a portion of the sent second data corresponding to the first data.

15. The method defined in claim 14 further including;
the ATM source transmission device composing the setup message;
the ATM source transmission device composing the first data message to have the first data;
the ATM source transmission device sending the first data message wherein the first data message coincides with the first data message of claim 14.

16. The method defined in claim 14 further including:
the ATM source transmission device receiving the sent second data message; and the
ATM source transmission device comparing the sent second data to the first data.

17. A machine-readable medium that provides instructions which, when executed by at least one processor on an ATM destination transmission device, cause said processor to perform operations comprising
receiving a first ATM setup message from a ATM source transmission device, the first ATM setup message having a destination address, the destination address having a first selector content;
establishing a connection between the ATM destination transmission device and the ATM source transmission device;
reading the first selector content and comparing the first selector content to a selector identification;
receiving a first data message on the connection, the first data message having a first data; and
if the selector content corresponds to the selector identification, composing a second data message having a second data based on the first data and causing the ATM destination transmission device to send the second data message on the connection.

18. The operations defined in claim 17 wherein the second data is one of at least a portion of the first data and an algorithmically transformed data based on at least a portion of the first data.

19. The operations defined in claim 17 wherein the second data is the first data.

20. An ATM destination transmission device that includes:
means for holding determined destination device selector identification;
means for receiving a setup message having a first selector content and setting up a connection;
means for receiving on the connection a first data message having a first data from an ATM source transmission device;
means for the destination device reading the first selector content and comparing the first selector content to the selector identification; and
means for the destination device composing a second data message having a second data based on the first data and an address of the ATM source transmission device and sending the second data message if the first selector content corresponds to the determined selector identification.

21. The ATM destination transmission device defined in claim 20 wherein at least a portion of the second data is the first data.

22. The ATM destination transmission device defined in claim 20 wherein the second data is the first data.

23. The ATM destination transmission device defined in claim 20 wherein the ATM destination transmission device includes means for responding to a coupled stored program and the means for responding to the stored program includes at least one of the means for receiving the setup message, the means for receiving the first data message, the means for reading the first selector content, and the means for composing the second data message.

24. An ATM destination transmission device that includes
a first destination receive circuit to receive a setup message from an ATM source transmission device and establish a connection with the ATM source transmission device;
a destination hold circuit to store a selector identification for a service to reflect back to the ATM source transmission device at least a portion of a data transmitted by the ATM source transmission device if the setup message includes a selector code equivalent to the selector identification;
a second destination receive circuit to receive on the connection a first data message having a first data from an ATM source transmission device;
a destination read circuit to read the selector code and compare the selector code to the stored selector identification; and
a destination compose circuit to compose and to send to the ATM source transmission device a second data message having a second data based on the first data if the selector code is equivalent to the stored selector identification.

25. The ATM destination transmission device defined in claim 24 wherein the second data is the first data.

26. The ATM destination transmission device defined in claim 24 that includes a processor to respond to a coupled stored program, and the processor responding to the stored program includes at least one of the first destination receive circuit, the second destination receive circuit, the destination read circuit, and the destination compose circuit.

* * * * *